United States Patent
Ajani et al.

(10) Patent No.: US 11,727,629 B2
(45) Date of Patent: Aug. 15, 2023

(54) UN-OCCLUDED VISUALIZATION OF FOCUS WITH DEPTH CONTINUITY WITH CONTEXT IN VOLUME RENDERING

(71) Applicant: Samsung Electronics Co., Ltd., Suwon-si (KR)

(72) Inventors: Bhavya Ajani, Bangalore (IN); Karthik Krishnan, Bangalore (IN); Hyunhee Jo, Suwon-si (KR); Sejin Yoo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 63 days.

(21) Appl. No.: 17/273,941

(22) PCT Filed: Sep. 20, 2019

(86) PCT No.: PCT/KR2019/012223
§ 371 (c)(1),
(2) Date: Mar. 5, 2021

(87) PCT Pub. No.: WO2020/060279
PCT Pub. Date: Mar. 26, 2020

(65) Prior Publication Data
US 2021/0335030 A1 Oct. 28, 2021

(30) Foreign Application Priority Data
Sep. 20, 2018 (IN) .............................. 201741033509

(51) Int. Cl.
*G06T 15/30* (2011.01)
*G06T 7/10* (2017.01)
(Continued)

(52) U.S. Cl.
CPC ................ *G06T 15/30* (2013.01); *G06T 7/10* (2017.01); *G06T 15/06* (2013.01); *G06T 15/08* (2013.01); *G06T 15/40* (2013.01)

(58) Field of Classification Search
None
See application file for complete search history.

(56) References Cited

U.S. PATENT DOCUMENTS 8,923,615 B2    12/2014  Schummers
9,367,914 B2 *   6/2016  Hager ....................... G06T 7/73
(Continued)

FOREIGN PATENT DOCUMENTS

JP    2018-023773 A    2/2018
WO    2017/066373 A1   4/2017
WO    2017/174351 A1   10/2017

OTHER PUBLICATIONS

Bhalerao, Abhir, et al. "Fast re-rendering of volume and surface graphics by depth, color, and opacity buffering." Medical Image Analysis 4.3 (2000): 235-251 (Year: 2000).*
Viola, Ivan, Armin Kanitsar, and Meister Eduard Groller. "Importance-driven volume rendering." IEEE visualization 2004. IEEE, 2004 (Year: 2004).*
(Continued)

*Primary Examiner* — Nuran Flora
(74) *Attorney, Agent, or Firm* — Jefferson IP Law, LLP (57) ABSTRACT

Unoccluded visualization of Anatomy in Volumetric Data. Embodiments disclosed herein relate to medical imaging systems, and more particularly to medical visualization systems, which can be used for visualizing anatomy. Embodiments herein disclose methods and systems for enabling unoccluded visualization of anatomy of interest in volumetric data. Embodiments herein disclose 3D visualization techniques for visualization of deep seated anatomy with no user interactions, while preserving depth continuity with surrounding(s) and with minimal distortion for improved clinical assessment.

4 Claims, 10 Drawing Sheets

(51) Int. Cl.
*G06T 15/06* (2011.01)
*G06T 15/08* (2011.01)
*G06T 15/40* (2011.01)

(56) References Cited

U.S. PATENT DOCUMENTS

| | | | |
|---|---|---|---|
| 9,704,284 | B2 | 7/2017 | Kuga et al. |
| 9,891,784 | B2* | 2/2018 | Lee .................. A61B 8/465 |
| 2010/0309199 | A1 | 12/2010 | Geller et al. |
| 2011/0069066 | A1 | 3/2011 | Engel |
| 2015/0208039 | A1 | 7/2015 | Kuga et al. |
| 2016/0125264 | A1 | 5/2016 | Dingeldey |
| 2016/0228000 | A1 | 8/2016 | Spaide |
| 2016/0256127 | A1* | 9/2016 | Lee .................. A61B 6/5264 |
| 2017/0061672 | A1 | 3/2017 | Zhou et al. |
| 2017/0319061 | A1 | 11/2017 | Spaide |
| 2017/0357406 | A1 | 12/2017 | Yi et al. |
| 2018/0035964 | A1 | 2/2018 | Funabasama et al. |

OTHER PUBLICATIONS

Richta, Rogerio, Philippe Poignet, and Chao Liu. "Three-dimensional motion tracking for beating heart surgery using a thin-plate spline deformable model." The International Journal of Robotics Research 29.2-3 (2010): 218-230 (Year: 2010).*

Zhang, Qi, Roy Eagleson, and Terry M. Peters. "Volume visualization: a technical overview with a focus on medical applications." Journal of digital imaging 24.4 (2011): 640-664 (Year: 2011).*

Šoltészová, Veronika, et al. "A multidirectional occlusion shading model for direct volume rendering." Computer Graphics Forum. vol. 29. No. 3. Oxford, UK: Blackwell Publishing Ltd, 2010 (Year: 2010).*

Indian Office Action dated Dec. 23, 2020, issued in Indian Application No. 201741033509.

Bhavya Ajani et al., Volumetric Clipping Surface: Un-occluded Visualization of Structures Preserving Depth Cues into Surrounding Organs, MICCAI 2018: Medical Image Computing and Computer Assisted Intervention—MICCAI 2018 pp. 291-298, Jan. 1, 2018.

* cited by examiner

Necessary context is preserved with depth continuity

Focus (Cartilage) is visible completely without occlusion

UN-OCCLUDED VISUALIZATION OF FOCUS WITH DEPTH CONTINUITY WITH CONTEXT IN VOLUME RENDERING

CROSS-REFERENCE TO RELATED APPLICATION(S)

This application is a U.S. National Stage application under 35 U.S.C. § 371 of an International application number PCT/KR2019/012223, filed on Sep. 20, 2019, which is based on and claimed priority of an Indian patent application number 201741033509, filed on Sep. 20, 2018, in the Indian Intellectual Property Office, the disclosure of which is incorporated by reference herein in its entirety.

TECHNICAL FIELD

Embodiments disclosed herein relate to medical imaging systems, and more particularly to medical visualization systems, which can be used for visualizing anatomy.

BACKGROUND ART

Medical Imaging data is typically acquired in three dimensions (3D). Pathology or extent of an injury is optimally visualized in 3D as underlying anatomy is 3D. However, presenting this 3D information on a 2D view is challenging. Traditionally, clinician visualize 3D data as 2D views or slices. As anatomy is 3D, radiologist has to scroll through multiple slices or simultaneously view multiple 2D views to perform assessment. The radiologist has to navigate multiple slices in different view for a complete visual inspection. This enables the radiologist to identify pathologies and to understand the anatomical context around it.

This evaluation becomes arduous when pathology is not fully contained in just one anatomical plane, which mostly is the case, leading to increase diagnostic time and fatigue. This approach is tedious and time consuming as normal Magnetic Resonance (MR) study may contains 100s of slices.

Figure 1:
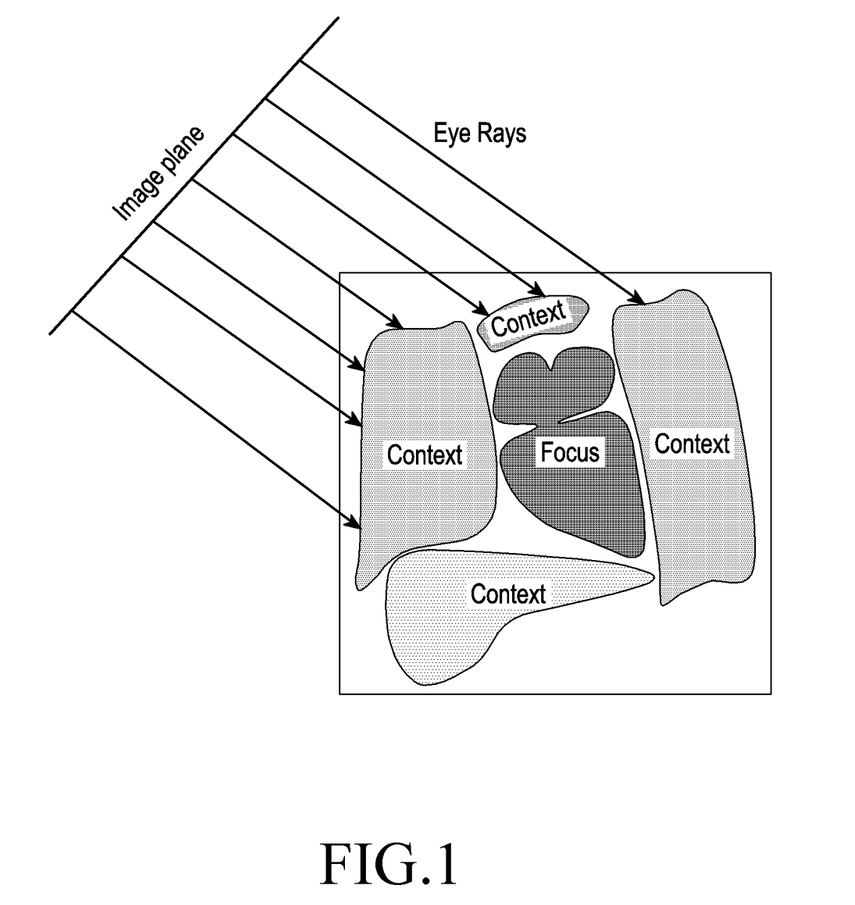
FIG. 1 depicts an example of volume rendering, where the focus region is completely occluded by other structures and is not visible in volume rendering.

Volume rendering technique allows for rapid appreciation of the anatomy (focus) and surrounding (context) in 3D. However, anatomical regions of interest (focus) are often hidden within volumetric data and adjoining structures (context) like bones and musculature may obstruct visualization of deep seated anatomies like cartilage. Consider the example of volume rendering depicted in FIG. 1, a set of view rays from viewer position (image plane) are cast into volumetric data and image created by accumulating shading (color/opacity) along the ray. But the focus region is completely occluded by Context (other structures) and is not visible in volume rendering.

For un-occluded visualization of anatomy of interest (focus) existing techniques modulate the visual parameters like opacity which are global operation and effect both Focus and Context alike. Further, some of the techniques uses semantic segmentation of Focus, to selectively remove occluding context. However, these techniques do not preserve depth continuity between Focus and Context which leads to perceptual distortions in visual space and makes clinical interpretation difficult.

DISCLOSURE OF INVENTION

Technical Problem

The principal object of the embodiments herein is to disclose methods and systems for enabling unoccluded visualization of anatomy of interest in volumetric data.

Another object of the embodiments herein is to disclose 3D visualization techniques for visualization of deep seated anatomy with no user interactions, while preserving depth continuity with surrounding(s) and with minimal distortion for improved clinical assessment.

Solution to Problem

Accordingly, the embodiments herein provide a method for three dimensional (3D) un-occluded visualization of a focus, the method comprising: generating a volumetric data set from a data source using at least one determined angle of view; filtering out the focus among the context by performing semantic segmentation from the data source; estimating a focus depth buffer for the focus for a plurality of eye rays; estimating a context depth buffer for a context using the estimated focus depth buffer; estimating a depth buffer from the estimated focus depth buffer and the context depth buffer; clipping eye rays and corresponding light rays based on the estimated depth buffer; generating a rendered data set using a volumetric clipping surface embedded in the depth buffer and the clipped rays; and generating a 3D image using the rendered data.

Accordingly, the embodiments herein provide an electronic device for three dimensional (3D) un-occluded visualization of a focus, the electronic device comprising a communication interface; and at least one processor coupled to the communication interface, wherein the at least one processor configured to: generate a volumetric data set from a data source using at least one determined angle of view; filter out the focus among the context by performing semantic segmentation from the data source; estimate a focus depth buffer for the focus for a plurality of eye rays; estimate a context depth buffer for a context using the estimated focus depth buffer; estimate a depth buffer from the estimated focus depth buffer and the context depth buffer; clip eye rays and corresponding light rays based on the estimated depth buffer; generate a rendered data set using a volumetric clipping surface embedded in the depth buffer and the clipped rays; and generate a 3D image using the rendered data.

Accordingly, the embodiments herein provide a method for three dimensional (3D) visualization of anatomy of at least one region of interest, the method comprising: identifying a plurality of view directions relative to the at least one region of interest and at least one surrounding anatomy; generating a volumetric data set using the plurality of view directions; filtering out the at least one region of interest among the at least one surrounding anatomy by performing semantic segmentation; preserving depth cues at the at least one surrounding anatomy; generating a rendered data set using the filtered out at least one region of interest and the preserved depth cues; and generating a 3D image using the rendered data.

Accordingly, the embodiments herein provide an electronic device for three dimensional (3D) visualization of anatomy of at least one region of interest, the electronic device comprising a communication interface; and at least one processor coupled to the communication interface, wherein the at least one processor configured to: identify, a plurality of view directions relative to the at least one region of interest and at least one surrounding anatomy; generate a volumetric data set using the plurality of view directions; filter out, by the at least one region of interest among the at least one surrounding anatomy by performing semantic segmentation; preserve depth cues at the at least one surrounding anatomy; generate a rendered data set using the filtered out at least one region of interest and the preserved depth cues; and generate a 3D image using the rendered data.

These and other aspects of the example embodiments herein will be better appreciated and understood when considered in conjunction with the following description and the accompanying drawings. It should be understood, however, that the following descriptions, while indicating example embodiments and numerous specific details thereof, are given by way of illustration and not of limitation. Many changes and modifications may be made within the scope of the example embodiments herein without departing from the spirit thereof, and the example embodiments herein include all such modifications.

BRIEF DESCRIPTION OF THE DRAWINGS

Embodiments herein are illustrated in the accompanying drawings, throughout which reference letters indicate corresponding parts in the various figures. The embodiments herein will be better understood from the following description with reference to the drawings, in which.

MODE FOR THE INVENTION

The example embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The description herein is intended merely to facilitate an understanding of ways in which the example embodiments herein can be practiced and to further enable those of skill in the art to practice the example embodiments herein. Accordingly, this disclosure should not be construed as limiting the scope of the example embodiments herein.

Embodiments herein may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The embodiments herein achieve methods and systems for enabling unoccluded visualization of anatomy of interest in volumetric data. Referring now to the drawings, and more particularly to FIGS. 2A through 8, where similar reference characters denote corresponding features consistently throughout the figures, there are shown example embodiments.

Embodiments herein disclose methods and systems for enabling unoccluded visualization of anatomy of interest in volumetric data. Embodiments herein disclose 3D visualization techniques for visualization of deep seated anatomy with no user interactions, while preserving depth continuity with surrounding(s) and with minimal distortion for improved clinical assessment.

Embodiments herein refer to the one or more anatomical regions of interest as 'focus'. Embodiments herein refer to adjoining structure(s) like bones and musculature which may obstruct visualization of the focus as 'context'. The focus may be often occluded by volumetric data and the context.

Figure 2A:
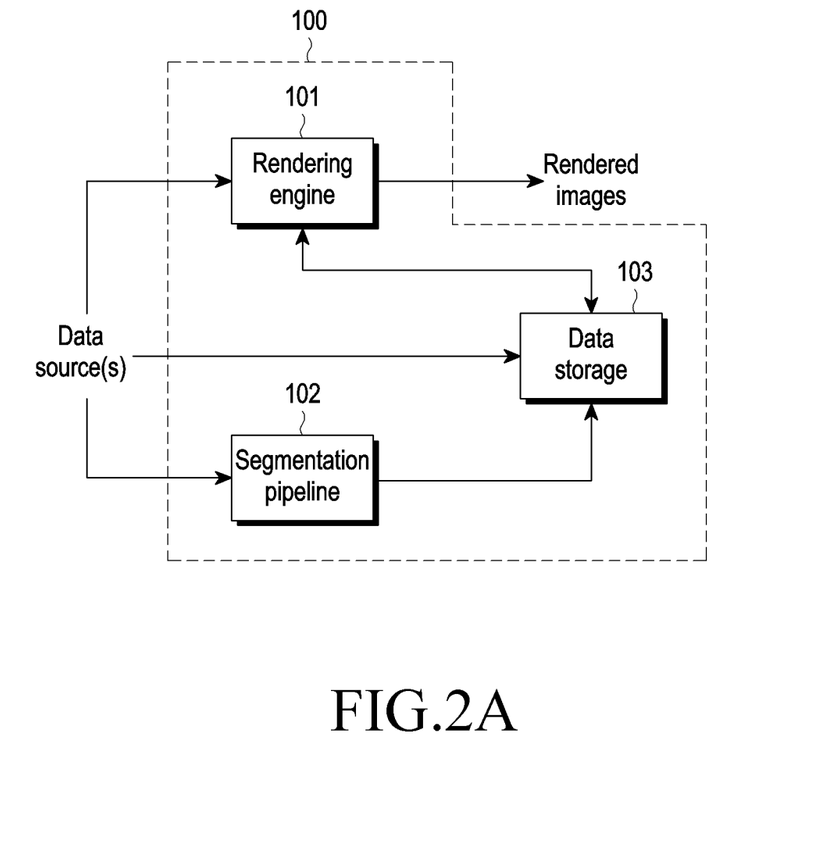
FIGS. 2A and 2B depict systems for enabling unoccluded visualization of anatomy of interest in volumetric data, according to embodiments as disclosed herein.
Figure 2B:
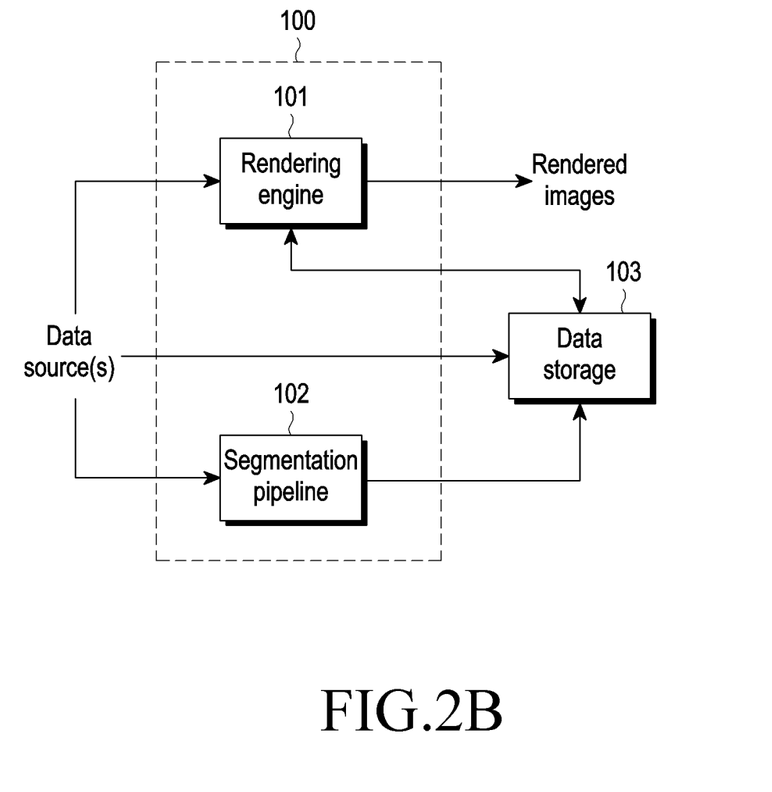

FIGS. 2A and 2B depict systems for enabling unoccluded visualization of anatomy of interest in volumetric data. According to various embodiments, a system may be referred to as an electronic device or a module or a processor. The system may include, for example, a portable communication device (e.g., a smartphone), a computer device, a portable multimedia device, a portable medical device, a camera, a wearable device, or a home appliance. The systems are not limited to those described above.

The system 100 may include at least one processor (e.g., a rendering engine 101, or a segmentation pipeline 102). The system 100 may further include one of a communication interface, a display or a memory (e.g., data storage 103). The communication interface, the display, or the memory may be coupled to the at least one processor. The communication interface may support establishing a direct (e.g., wired) communication channel or a wireless communication channel between devices (or blocks) and performing communication via the established communication channel. The communication interface may support a direct (e.g., wired) communication or a wireless communication. The system 100, as depicted, comprises, a rendering engine 101, and a segmentation pipeline 102. In an embodiment herein, the system 100 may comprise a data storage 103 (as depicted in FIG. 2A). In an embodiment herein, the system 100 may be connected to a data storage 103 (as depicted in FIG. 2B), wherein the system 100 may be connected to the data storage 103, using at least one of a wired means or a wireless means.

The system 100 may be connected to one or more data sources, wherein the data comprises at least one of, but not limited to, data generated using Computer Tomography (CT), Magnetic Resonance Imaging (MRI), Ultrasound (US), and so on. Examples of the data sources can be, but not limited to, CT scanning machines, MRI machines, US scanners, data storage means (such as, but not limited to, the data storage 103), the Cloud, the Internet, a data server, a file server, and so on. In an embodiment herein, the system 100 can receive the information in real time from the data sources. In an embodiment herein, the system 100 can fetch the information from the data sources at pre-defined time intervals. In an embodiment herein, the system 100 can fetch the information from the data sources on pre-defined events occurring (such as receiving a command from a user/application).

The segmentation pipeline 102 can perform semantic segmentation of the data, received from one or more data sources. The segmentation pipeline 102 can provide the segmented data to the rendering engine 101.

The rendering engine 101 can determine one or more angles of view for a given focus. In an embodiment herein, the rendering engine 101 can determine one or more angles of view for multiple focuses. Examples of the angle of view can be, but not limited to, the current orientation of a camera of the scanning machine, the viewpoint of a user viewing the data, and so on. In an embodiment herein, the rendering engine 101 can determine the focus. In an embodiment herein, the rendering engine 101 can receive external inputs from a user or from another system/module indicating the focus. The rendering engine 101 can generate a volumetric data set using the at least one angle of view.

The rendering engine 101 can filter out the focus from the volumetric data set, using the semantic segmentation, as provided by the segmentation pipeline 102.

The rendering engine 101 can preserve depth cues at the focus and one or more contexts, present in the surrounding of the focus and/or which may be related to the focus using a depth buffer. The rendering engine 101 can estimate intersection depths for a plurality of eye rays (also referred to herein as angle of view) intersecting the focus (hereinafter referred to as focus depth buffer). The focus depth buffer can be the distance of the focus from the viewer/user/image plane. The estimated intersection depths for the focus can be used by the rendering engine 101 to extrapolate depth for one or more contexts, present in the surrounding of the focus and/or which may be related to the focus (hereinafter referred to as context depth buffer). The context depth buffer can be the distance of the context from the viewer/user/image plane. The rendering engine 101 can extrapolate the depth using suitable means such as thin plate spline, radial basis function, and so on. The rendering engine 101 can estimate intersection depths for a plurality of eye rays intersecting the focus from a point above the data set. The rendering engine 101 can estimate the depth buffer from the estimated focus depth buffer and the estimated context depth buffer.

Figure 3:
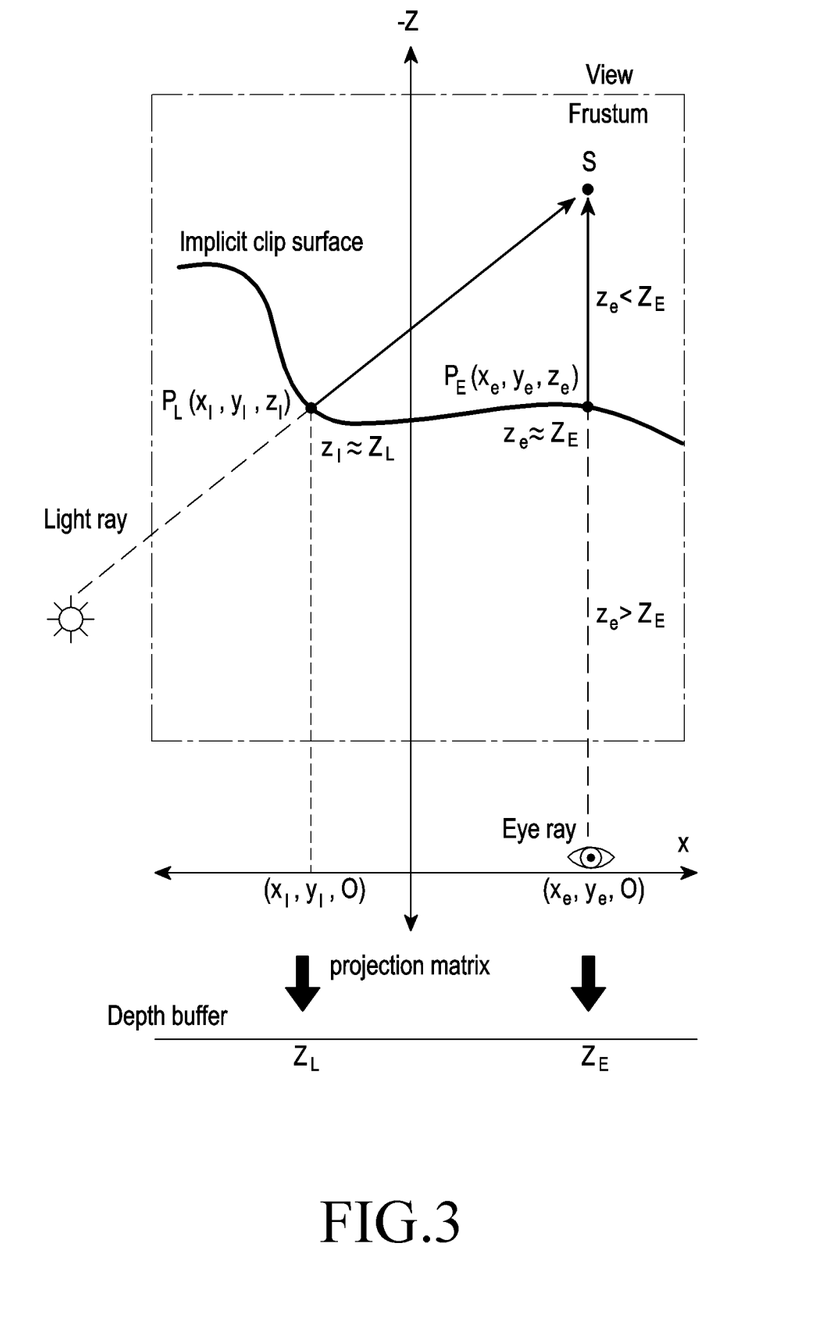
FIG. 3 depicts an example for clipping the eye rays and the corresponding light rays based on the estimated intersection depths for the focus and the context, according to embodiments as disclosed herein.

The rendering engine 101 can clip the eye rays and the corresponding light rays based on the estimated intersection depths for the focus and the context (as depicted in an example depicted in FIG. 3). The rendering engine 101 can then generate a rendered data set using a volumetric clipping surface embedded in the depth buffer and the clipped rays. The rendering engine 101 can generate a 3D image using the rendered data. The rendering engine 101 can generate the 3D image in real time, and update the 3D image in real time as the angle of view of the 3D image changes.

The rendering engine 101 can modulate one or more visual parameters of the generated 3D image, such as, but not limited to, opacity, color, sharpness, contrast, color, and so on. The rendering engine 101 can provide visualization effects such as depth of field, blur, and so on.

The rendering engine 101 can make the rendered images available to a user in real time. The rendering engine 101 can store the rendered images in a suitable location, such as, but not limited to, the data storage 103, the Cloud, a file server, a data server, and so on.

Figure 4:
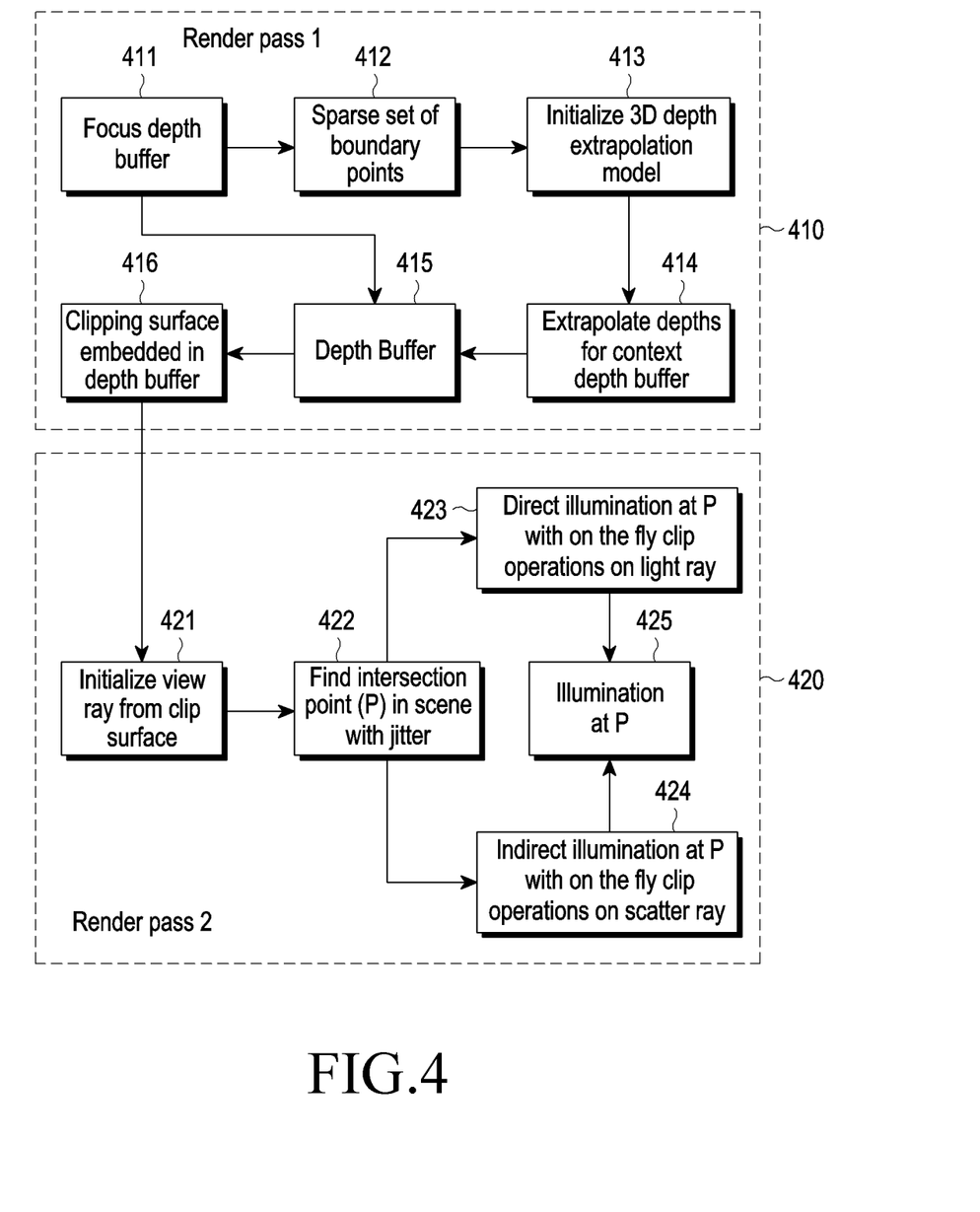
FIG. 4 is a flow diagram for making anatomy of interest visible in volumetric data depending on the present viewpoint, according to embodiments as disclosed herein.

FIG. 4 is a flow diagram for making anatomy of interest visible in volumetric data depending on the present viewpoint. The process as depicted herein, may comprise of two or more render passes.

In a first render pass 410, the rendering engine 101 can determine (411) the focus depth buffer. The rendering engine 101 can determine (412) a set of boundary points around the focus. The rendering engine 101 can initialize (413) a 3D depth extrapolation model and extrapolate (414) the depths for the context depth buffer using a suitable means such as thin plate spline, radial basis function, and so on. The rendering engine 101 can estimate (415) the depth buffer using the focus depth buffer and the context depth buffer. The rendering engine 101 can embed (416) a clipping surface, along which the data can be clipped, in the depth buffer. The clipping surface can be based on the angle of view and the light and eye rays (as depicted in the example in FIG. 3).

In a second render pass 420, the rendering engine 101 can initialize (421) the viewing ray from the clipping surface. The rendering engine 101 can find (422) a point (P), where the viewing rays intersect. In an embodiment, the rendering engine 101 can factor in jitter, when determining the intersection point (P). The rendering engine 101 can determine (423) the direct illumination at P with on the fly clip operations on a light ray. The rendering engine 101 can determine (424) the indirect illumination at P with on the fly clip operations on a scatter ray. The rendering engine 101 can determine (425) the illumination at point P by combining the determined direct illumination and the determined indirect illumination.

Figure 5:
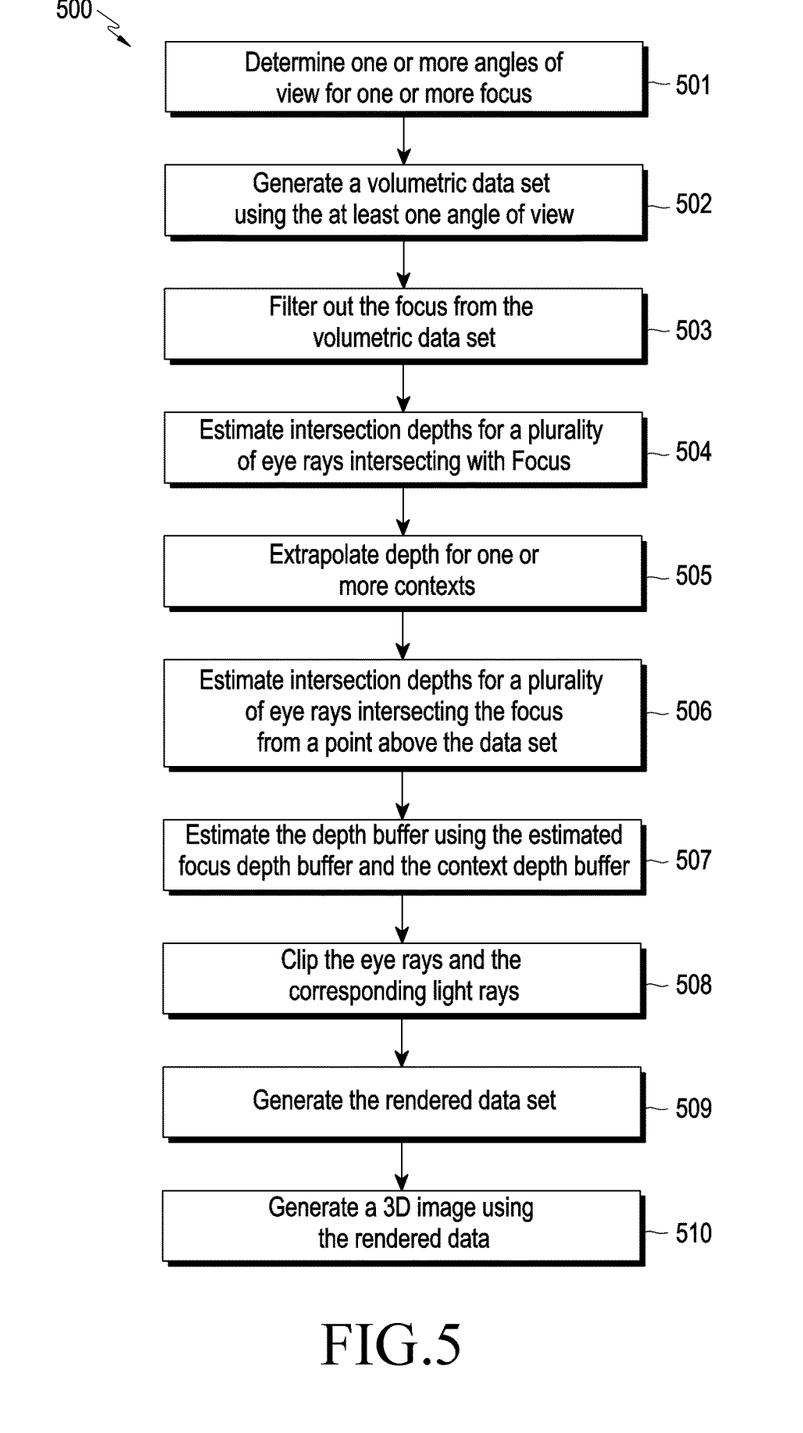
FIG. 5 is a flowchart depicting a process for rendering 3D data, which comprises of anatomy of interest being visualized in an unoccluded manner, according to embodiments as disclosed herein.

FIG. 5 is a flowchart depicting a process for rendering 3D data, which comprises of anatomy of interest being visualized in an unoccluded manner. The rendering engine 101 determines (501) one or more angles of view for one or more focus. The rendering engine 101 generates (502) a volumetric data set using the at least one angle of view. The rendering engine 101 filters (503) out the focus from the volumetric data set, using the semantic segmentation, as provided by the segmentation pipeline 102.

The rendering engine 101 can preserve depth cues at the focus and one or more contexts, present in the surrounding of the focus and/or which may be related to the focus using a depth buffer. The rendering engine 101 estimates (504) intersection depths for a plurality of eye rays intersecting the focus. The rendering engine 101 extrapolates (505) depth for one or more contexts, present in the surrounding of the focus and/or which may be related to the focus uses the estimated intersection depths using suitable means such as thin plate spline, radial basis function, and so on. The rendering engine 101 estimates (506) intersection depths for a plurality of eye rays intersecting the focus from a point above the data set. The rendering engine 101 estimates (507) the depth buffer using the estimated focus depth buffer and the context depth buffer.

The rendering engine 101 clips (508) the eye rays and the corresponding light rays based on the estimated intersection depths for the focus and the context (as depicted in the example in FIG. 3). The rendering engine 101 then generates (509) the rendered data set using the volumetric clipping surface embedded in the depth buffer. The rendering engine 101 generates (510) a 3D image using the rendered data. The rendering engine 101 can generate the 3D image in real time, and update the 3D image in real time as the angle of view of the 3D image changes.

The various actions in method 500 may be performed in the order presented, in a different order or simultaneously. Further, in some embodiments, some actions listed in FIG. 5 may be omitted.

Figure 6A:
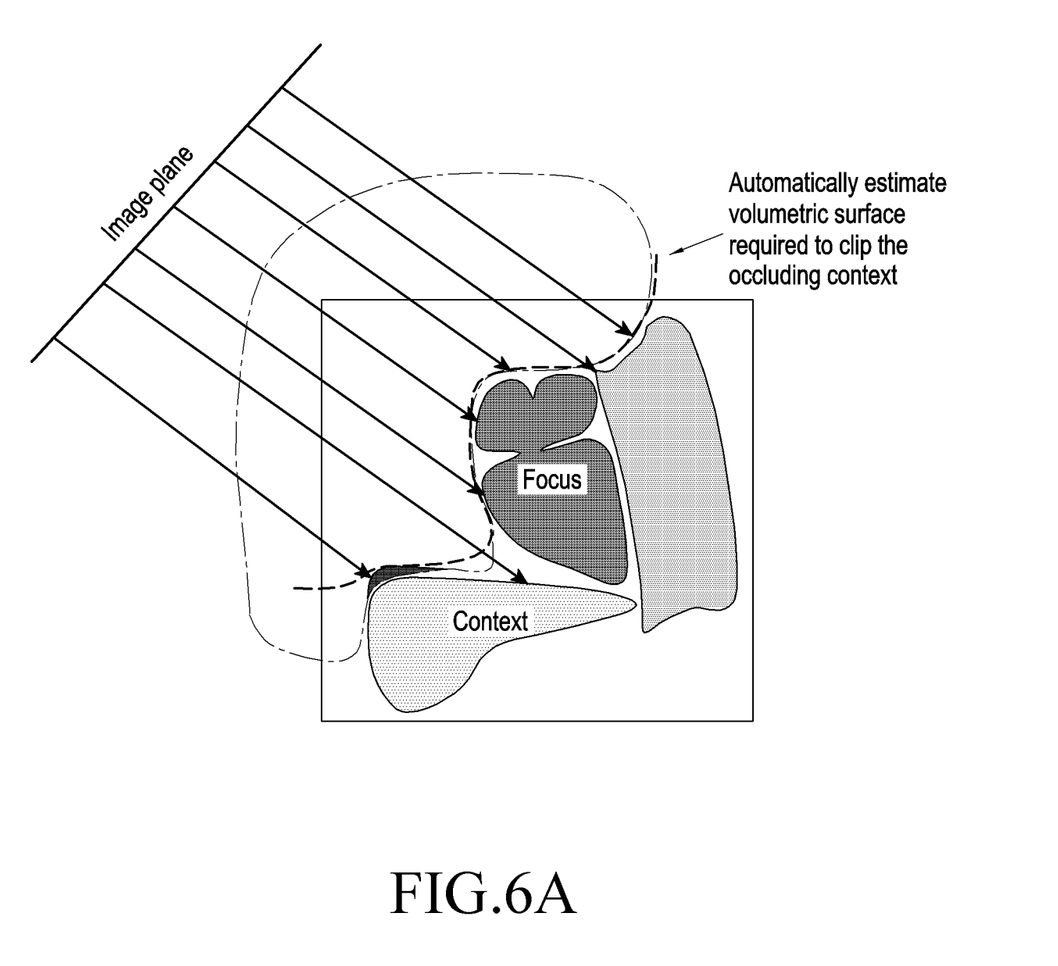
FIGS. 6A and 6B depict example scenarios where the occluding context is clipped and the focus region can be viewed without occlusion, according to embodiments as disclosed herein.
Figure 6B:
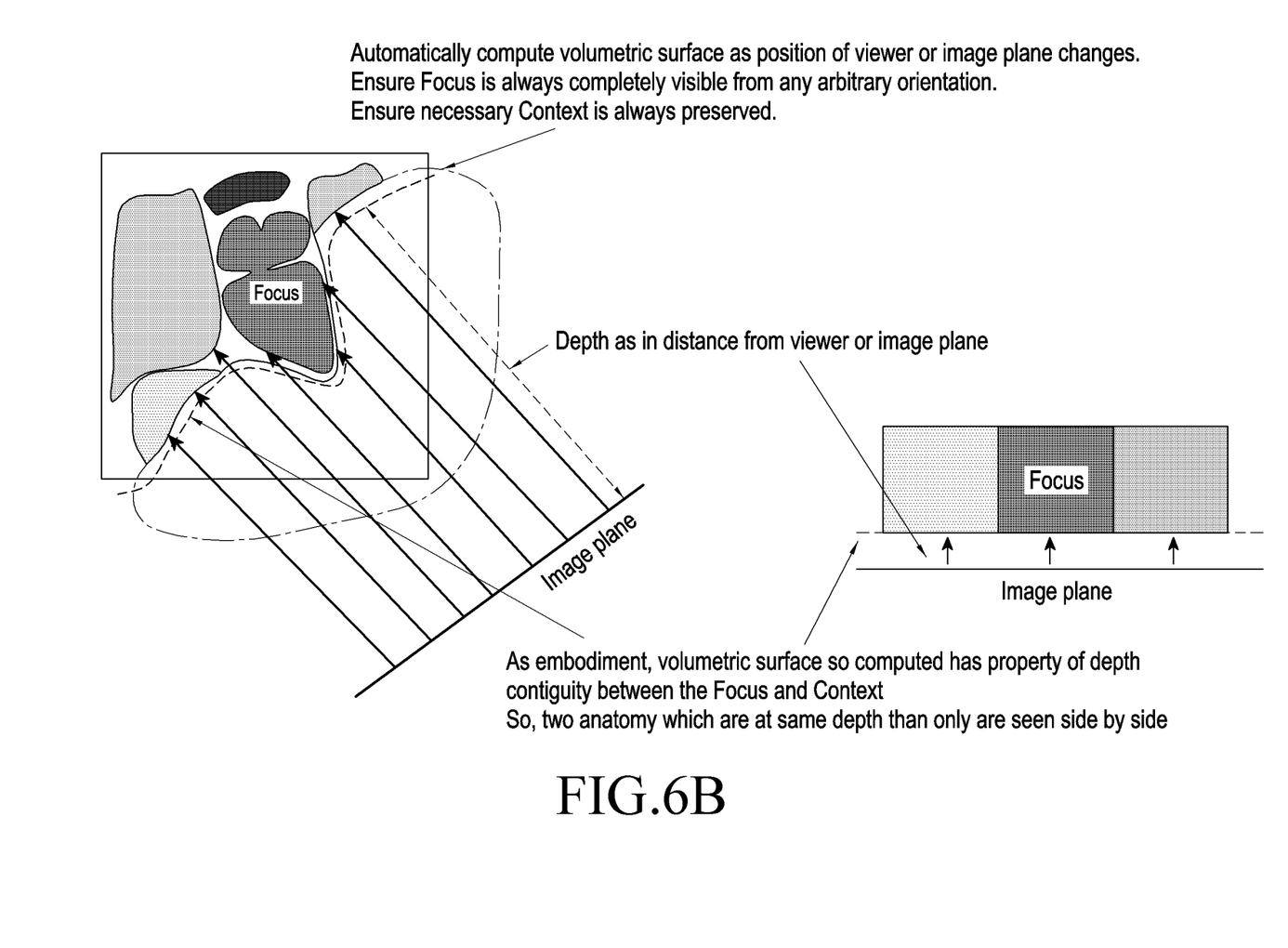

FIGS. 6A and 6B depict example scenarios where the occluding context is clipped and the focus region can be viewed without occlusion, according to embodiments as disclosed herein. In the depicted examples, the rendering engine 101 can automatically estimate volumetric surface require to clip the occluding context. In the depicted examples, even though the viewing angle varies, the rendering engine 101 automatically computes volumetric surface as position of viewer or image plane changes and ensures that the focus is always completely visible from any arbitrary orientation and necessary context is always preserved. The rendering engine 101 computes the volumetric surface so as to maintain depth contiguity between the focus and the context, hereby ensuring that anatomies which are at the same depth are seen side by side.

Figure 7:
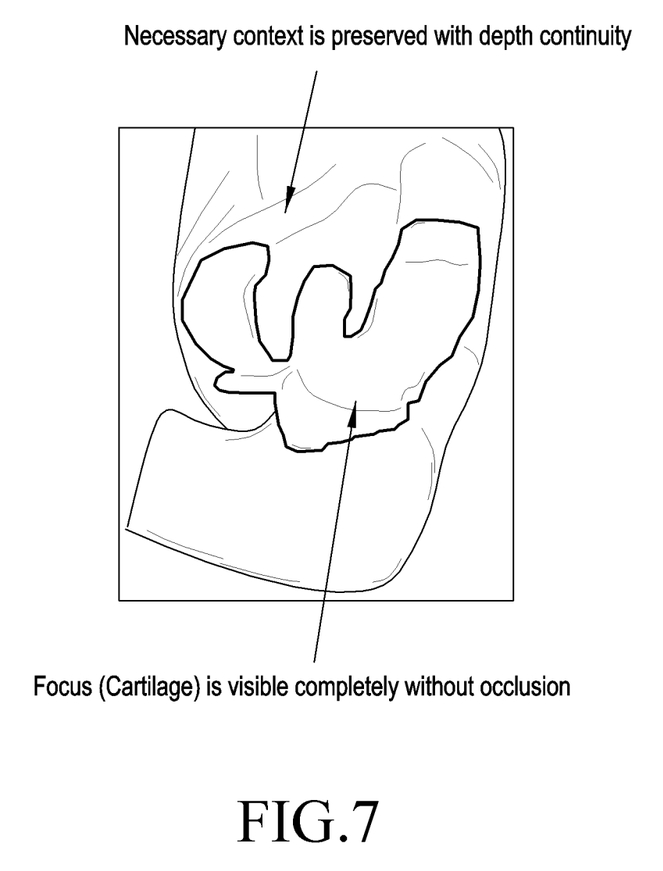
FIGS. 7 and 8 depict example volumetric renderings of the focus regions, according to embodiments as disclosed herein.
Figure 8:
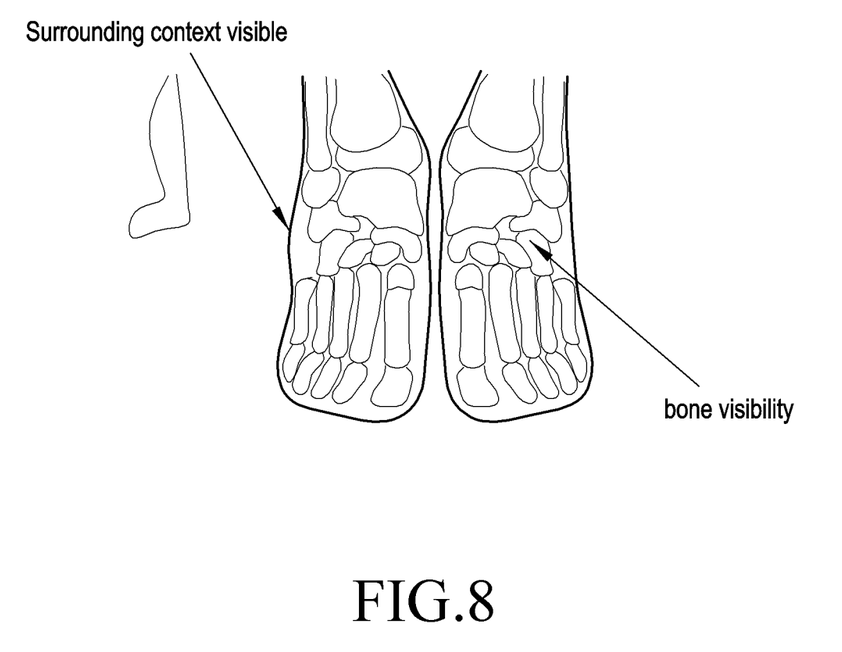

FIGS. 7 and 8 depict example volumetric renderings of the focus regions, according to embodiments as disclosed herein. FIG. 7 depicts an example rendering of a knee from a MR data set. Embodiments herein enable an un-occluded visualization of the hidden anatomy of interest (cartilage, in this example) while preserving surrounding depth continuity. FIG. 8 depicts an example of a rendered feet, where a CT data set was used. Here, the surrounding context can be seen and the bones of the feet can be seen without occlusion.

Embodiments herein have been explained in the context of direct volume rendering merely as an example, and it may be obvious to a person of ordinary skill in the art to extend embodiments as disclosed herein to other forms of volume rendering techniques such as, but not limited to, cinematic rendering, texture based rendering, and so on.

Embodiments herein have been explained using volume rendering merely as an example, and it may be obvious to a person of ordinary skill in the art to extend embodiments as disclosed herein to other forms of rendering techniques such as, but not limited to, polygonal surface rendering.

Embodiments herein preserve surrounding context at similar depth with minimal distortion in visual space, which enables the user to orient him/her self for accurate assessment. Embodiments herein enable an automatic un-occluded visualization of anatomy, hereby enabling a user to perform rapid assessment as it minimizes user interface and reduces workflow fatigue.

The embodiments disclosed herein can be implemented through at least one software program running on at least one hardware device and performing network management functions to control the elements. The elements shown in FIG. 1 can be at least one of a hardware device, or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of embodiments, those skilled in the art will recognize that the embodiments herein can be practiced with modification within the spirit and scope of the embodiments as described herein.

A method (or some operations of the method) of according to various embodiments may be performed by one of at least one processor (e.g., a rendering engine 101 or a segmentation engine 102 in FIGS. 2A and 2B), an electronic device, or a system (e.g., a system 100 in FIGS. 2A and 2B).

According to various embodiments, a method (500) for three dimensional (3D) un-occluded visualization of a focus may comprises: generating (502), by a rendering engine 101, a volumetric data set from a data source using at least one determined angle of view, filtering out (503, or identifying), by the rendering engine 101, the focus among the context by performing semantic segmentation from the data source; estimating (504, or identifying), by the rendering engine 101, a focus depth buffer for the focus for a plurality of eye rays, estimating (505, or identifying), by the rendering engine 101, a context depth buffer for a context using the estimated focus depth buffer; estimating (507), by the rendering engine 101, a depth buffer from the estimated focus depth buffer and the context depth buffer; clipping (508, or identifying), by the rendering engine 101, eye rays (or gaze directions or angles of view) and corresponding light rays based on the estimated depth buffer, generating (509), by the rendering engine 101, a rendered data set using a volumetric clipping surface embedded in the depth buffer and the clipped rays; and generating (510), by the rendering engine 101, a 3D image using the rendered data.

According to various embodiments, the method may further comprises displaying the 3D image via a display.

According to various embodiments, extrapolating the focus depth buffer and the context depth buffer, by the rendering engine 101, may use at least one of a Thin Plate Spline, and a Radial Basis Function.

According to various embodiments, the rendered data set may be generated, by the rendering engine 101, using the extrapolated depth to selectively render the focus and the context.

According to various embodiments, the method may further comprises modulating, by the rendering engine 101, at least one visual parameter using the extrapolated depth buffer.

According to various embodiments, the 3D image may be generated, by the rendering engine 101, using direct illumination and indirect illumination.

According to various embodiments, a method (500) for three dimensional (3D) un-occluded visualization of a focus may comprises: generating (502), by a rendering engine 101, a volumetric data set from a data source using at least one determined angle of view, filtering out (503, or identifying), by the rendering engine 101, the focus among the context by performing semantic segmentation from the data source; estimating (504, or identifying), by the rendering engine 101, a focus depth buffer for the focus for a plurality of eye rays, estimating (505, or identifying), by the rendering engine 101, a context depth buffer for a context using the estimated focus depth buffer; estimating (507), by the rendering engine 101, a depth buffer from the estimated focus depth buffer and the context depth buffer; clipping (508, or identifying), by the rendering engine 101, eye rays (or gaze directions) and corresponding light rays based on the estimated depth buffer, generating (509), by the rendering engine 101, a rendered data set using a volumetric clipping surface embedded in the depth buffer and the clipped rays; and generating (510), by the rendering engine 101, a 3D image using the rendered data.

According to various embodiments, a system 100 for three dimensional (3D) un-occluded visualization of a focus, the system may comprises a rendering engine 101 configured for: generating a volumetric data set from a data source using at least one determined angle of view, filtering out (or identifying) the focus among the context by performing semantic segmentation from the data source, estimating (or identifying) a focus depth buffer for the focus for a plurality of eye rays, estimating (or identifying) a context depth buffer for a context using the estimated focus depth buffer, estimating (or identifying) a depth buffer from the estimated focus depth buffer and the context depth buffer, clipping (or identifying) eye rays and corresponding light rays based on the estimated depth buffer, generating a rendered data set using a volumetric clipping surface embedded in the depth buffer and the clipped rays, and generating a 3D image using the rendered data.

According to various embodiments, the system 100 may further comprises a display configured to display the 3D image.

According to various embodiments, the rendering engine 101 may be configured for extrapolating the focus depth buffer and the context depth buffer using at least one of a Thin Plate Spline, and a Radial Basis Function.

According to various embodiments, the rendering engine 101 may be configured for generating the rendered data set using the extrapolated depth to selectively render the focus and the context.

According to various embodiments, the rendering engine 101 is further configured for modulating at least one visual parameter using the extrapolated depth buffer.

According to various embodiments, the rendering engine 101 is configured for generating the 3D image using direct illumination and indirect illumination.

According to various embodiments, A method for three dimensional (3D) visualization of anatomy of at least one region of interest, the method may comprises: identifying, by a rendering engine 101, a plurality of view directions relative to the at least one region of interest and at least one surrounding anatomy, generating, by the rendering engine 101, a volumetric data set using the plurality of view directions, filtering out (or identifying), by a segmentation engine 102, the at least one region of interest among the at least one surrounding anatomy by performing semantic segmentation, preserving (or storing), by the rendering engine 101, depth cues at the at least one surrounding anatomy, generating, by the rendering engine (101), a rendered data set using the filtered out at least one region of interest and the preserved depth cues, and generating, by the rendering engine 101, a 3D image using the rendered data.

According to various embodiments, the method may further comprises displaying the 3D image via a display.

According to various embodiments, the depth cues may be preserved, by the rendering engine 101, at a plurality of control points on a surface of the at least one region of interest using an extrapolating function and are set, by the rendering engine 101, as at least one first order statistic of a segmentation depth buffer.

According to various embodiments, the rendered data set may be generated, by the rendering engine 101, using the depth cues to selectively render the at least one region of interest and an immediate surrounding of the at least one region of interest with high quality as compared to a non-immediate surrounding of the at least one region of interest.

According to various embodiments, the 3D image is generated, by the rendering engine 101, using direct illumination and indirect illumination.

According to various embodiments, A system 100 for three dimensional (3D) visualization of anatomy of at least one region of interest, the system may comprises: a rendering engine 101 configured for: identifying, a plurality of view directions relative to the at least one region of interest and at least one surrounding anatomy, generating a volumetric data set using the plurality of view directions, a segmentation engine 102 configured for: filtering out (or identifying), by the at least one region of interest among the at least one surrounding anatomy by performing semantic segmentation, the rendering engine 101 further configured for: preserving (or storing) depth cues at the at least one surrounding anatomy, generating a rendered data set using the filtered out at least one region of interest and the preserved depth cues, and generating a 3D image using the rendered data.

According to various embodiments, the system 100 may further comprises a display configured to display the 3D image.

According to various embodiments, the rendering engine 101 may be configured for preserving the depth cues at a plurality of control points on a surface of the at least one region of interest using an extrapolating function, and setting the depth cues as at least one first order statistic of a segmentation depth buffer.

According to various embodiments the rendering engine 101 may be configured for generating the rendered data set using the depth cues to selectively render the at least one region of interest and an immediate surrounding of the at least one region of interest with high quality as compared to a non-immediate surrounding of the at least one region of interest.

According to various embodiments, the rendering engine 101 may be configured for generating the 3D image using direct illumination and indirect illumination.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. A method for three dimensional (3D) un-occluded visualization of a focus, the method comprising:
generating a volumetric data set from a data source using at least one determined angle of view;
filtering out the focus which is at least one region of interest from a context which is at least one region surrounding the focus by performing semantic segmentation from the data source;
estimating a focus depth buffer for the focus by estimating intersection depths for a plurality of eye rays;
determining a set of boundary points around the focus;
initializing a 3-dimensional (3D) depth extrapolation model;
extrapolating a context depth buffer for the context using the estimated focus depth buffer, and at least one of a thin plate spline, or a radial basis function;
estimating a depth buffer from the estimated focus depth buffer and the extrapolated context depth buffer;
clipping the plurality of eye rays and corresponding light rays based on the estimated depth buffer;
generating a rendered data set using a volumetric clipping surface embedded in the depth buffer, and the clipped the plurality of eye rays;
generating a 3D image using the rendered data set; and
modulating at least one visual parameter of the generated 3D image to provide visualization effects,
wherein the focus is hidden by at least one region of the context,
wherein the rendered data set is generated, using the depth buffer to selectively render the focus and the context, and
wherein the volumetric clipping surface is estimated to maintain depth continuity on the set of boundary points of the focus and the context based on the depth buffer.

2. The method of claim 1, wherein the 3D image is generated, using direct illumination and indirect illumination.

3. An electronic device for three dimensional (3D) un-occluded visualization of a focus, the electronic device comprising:
a transceiver; and
at least one processor coupled to the transceiver,
wherein the at least one processor is configured to:
generate a volumetric data set from a data source using at least one determined angle of view,
filter out the focus which is at least one region of interest from a context which is at least one region of surrounding the focus by performing semantic segmentation from the data source,
estimate a focus depth buffer by estimating intersection depths for the focus for a plurality of eye rays,
determine a set of boundary points around the focus,
initializing a 3-dimensional (3D) depth extrapolation model,
extrapolate a context depth buffer for the context using the estimated focus depth buffer, and at least one of a thin plate spline, or a radial basis function,
estimate a depth buffer from the estimated focus depth buffer and the extrapolated context depth buffer,
clip the plurality of eye rays and corresponding light rays based on the estimated depth buffer,
generate a rendered data set using a volumetric clipping surface embedded in the depth buffer and the clipped the plurality of eye rays,
generate a 3D image using the rendered data set, and
modulate at least one visual parameter of the 3D image to provide visualization effects,
wherein the focus is hidden by the at least one region of the context,
wherein the rendered data set is generated, using the depth buffer to selectively render the focus and the context, and
wherein the volumetric clipping surface is estimated to maintain depth continuity between side-by-side regions related to the focus and the context based on the depth buffer.

4. The electronic device of claim 3, wherein the at least one processor is further configured to generate the 3D image using direct illumination and indirect illumination.

* * * * *